UNITED STATES PATENT OFFICE.

JAMES H. GRAVELL, OF BROOKLYN, NEW YORK, ASSIGNOR TO THOMSON SPOT WELDER COMPANY, OF BOSTON, MASSACHUSETTS, A CORPORATION OF MASSACHUSETTS.

METHOD OF ELECTRIC WELDING.

1,312,844.  Specification of Letters Patent.  Patented Aug. 12, 1919.

No Drawing.  Application filed January 16, 1918.  Serial No. 212,041.

*To all whom it may concern:*

Be it known that I, JAMES H. GRAVELL, a citizen of the United States, and a resident of Brooklyn, in the county of Kings and State of New York, have invented certain new and useful Improvements in Methods of Electric Welding, of which the following is a specification.

This invention relates to electric welding and especially to that type of welding known as spot welding.

The object of the invention is to improve the character and otherwise facilitate the welding of sheet metal whose surface has been oxidized or rusted.

It is well known in the art that it is very difficult and practically impossible to obtain satisfactory spot welds between sheets that are oxidized or rusted and it has been the common practice to clean the sheets at their points of contact by means of the regular pickling agents for steel or by the use of an emery wheel. Although the emery wheel produces a satisfactory welding condition it is expensive and the pickling bath, although being less expensive, produces a product that rusts very quickly. In case the effects of the pickling bath are neutralized in the regular way by dipping the work into a solution of lime, sufficient lime remains on the surface to insulate the work and therefore prohibits the passage of the current used in the welding operation.

I have discovered that satisfactory welding of rusty and oxidized work can be done in a very efficient manner if, before the welded joint is assembled, it is painted or treated with a solution of an acid which forms water-insoluble salts, and the welding done before the acid has had an opportunity to dry.

One of the best methods I have found in practice is to apply a solution of phosphoric acid, using about one part of phosphoric acid and five parts of water by volume, between the sheets before starting the weld. This has the effect of breaking down the scale and allowing a small portion of the current to pass. As soon as the heat is developed at the joint due to the passage of the current, the acid becomes very active and quickly cleans the work. The scale or oxid being then removed the current passes to its full capacity and quickly heats the work and by the application of pressure the weld is completed as is well known in the art. No effort need be made to remove the acid after the operation as no ill effects such as rust will develop. In case the work is oily I substitute, in the solution instead of the water, a solvent which will dissolve the acid and at the same time act on the oil. A solvent such as acetone or alcohol has proved very satisfactory.

It is quite evident that I may not only apply the solution between the parts to be welded but also may apply the solution at the places where the welding electrodes contact with the work.

In case it is found convenient to pickle and lime the work before welding, it will be found of great advantage to use my solution just before welding as it removes the lime and produces a good weld without danger of causing the work to rust.

What I claim as my invention is:—

1. The method of electrode welding which consists in treating the contacting surfaces of the work with an acid, passing a current through the contacting surfaces to cause the acid to remove the oxid therefrom and to produce a weld.

2. The method of welding consisting in applying an acid whose iron salts are insoluble in water between the contacting surfaces, passing a current through the contacting surfaces to cause the acid to remove the oxid and to produce a weld.

3. The method of welding consisting in applying a solution of phosphoric acid between the contacting surfaces, passing a current from one surface to the other to cause the solution to remove the oxidization and applying pressure to the heated section to produce a weld.

4. The method of welding consisting in treating the parts to be welded with a solution containing phosphoric acid and welding before the said solution has had an opportunity to dry.

5. The method of electric welding consisting in applying to the parts to be welded a solution containing phosphoric acid and water, passing an electric current from one part to the other before the solution has dried and applying pressure to complete the weld.

6. The method of electric welding consisting in applying a solution containing phosphoric acid, acetone and alcohol to the parts to be welded, passing an electric current from one part to the other and applying pressure to complete the weld.

7. The method of electric welding, consisting in applying to the work in the path of the electric current a solution containing phosphoric acid, passing an electric current through the work for the purpose of causing the solution to break down the oxid and also to heat the work and applying pressure to complete the weld.

8. The method of electric welding consisting in applying to the work in the path of the electric current a solution containing an acid, acetone or alcohol, passing an electric current through the work for the purpose of causing the solution to break down the oxid and also for the purpose of heating the work and applying pressure to complete the weld.

Signed at New York, in the county of New York and State of New York, this 15th day of January, A. D. 1918.

JAMES H. GRAVELL.

Witnesses:
F. B. TOWNSEND,
F. C. SIEBOLD.